United States Patent [19]

Yamazaki et al.

[11] Patent Number: 5,108,971

[45] Date of Patent: Apr. 28, 1992

[54] PLATINUM CATALYST COMPOSITION AND PROCESS FOR PRODUCING THE SAME

[75] Inventors: Toshio Yamazaki; Masaaki Yamaya, both of Annaka; Hideyoshi Yanagisawa, Matsuida; Masayuki Takahashi, Annaka, all of Japan

[73] Assignee: Shin-Etsu Chemical Co., Ltd., Tokyo, Japan

[21] Appl. No.: 612,454

[22] Filed: Nov. 14, 1990

[30] Foreign Application Priority Data

Nov. 15, 1989 [JP] Japan .................. 1-296995

[51] Int. Cl.$^5$ .............................. B01J 31/30
[52] U.S. Cl. .................. 502/152; 502/150; 502/162; 502/169
[58] Field of Search ............ 502/152, 169, 162, 150

[56] References Cited

U.S. PATENT DOCUMENTS 3,907,852  9/1975  Oswald et al. .............. 502/162

*Primary Examiner*—Patrick P. Garvin
*Assistant Examiner*—Brent M. Peebles
*Attorney, Agent, or Firm*—Oblon, Spivak, McClelland, Maier & Neustadt

[57] ABSTRACT

The platinum catalyst composition comprises a diolefin component represented by the following general formula:

$$CH_2=CH-R-CH=CH_2$$

wherein R is a divalent saturated hydrocarbon radical, and a platinum compound component. The platinum catalyst composition is extremely useful for hydrosilylation of an organosilicon compound having a $\equiv SiH$ radical with an olefin. When used for the hydrosilylation reaction, it inhibits effectively the isomerization of the starting material olefin, thereby enabling the intended organosilicon compound to be obtained in a high yield.

14 Claims, No Drawings

PLATINUM CATALYST COMPOSITION AND PROCESS FOR PRODUCING THE SAME

BACKGROUND OF THE INVENTION

1. Field of the Invention

This invention relates to a novel platinum catalyst composition useful for the so-called hydrosilylation.

2. Description of the Prior Art

The reaction for adding an organosilicon compound having a ≡SiH radical in its molecule to an organic compound having an unsaturated double bond is known as the so-called hydrosilylation, and has been utilized for the synthesis of new organosilicon compounds.

In the hydrosilylation employed for the synthesis of organosilicon compounds, a variety of platinum catalysts have generally been used. As the platinum catalysts for such use, there have been known, for example, platinum supported on activated carbon (U.S. Pat. No. 2,970,150), chloroplatinic acid (U.S. Pat. No. 2,823,218), a platinum-organic compound complex (U.S. Pat. No. 3,159,601), a platinum-organofunctional polysiloxane complex (Japanese Patent Publication (KOKOKU) No. 63-19218 (1988)), etc.

Though the known platinum catalysts have the merit of being rich in reactivity by virtue of good activity for addition reaction, their high activity would cause rearrangement of a terminal unsaturated double bond of the organic compound used as a reactant in the hydrosilylation. As a result of the rearrangement, isomeric raw materials with poor reactivity may remain as unreacted material in the reaction system, or isomers of the intended organosilicon compound may be by-produced in large quantities, leading to an unfavorably lower yield of the desired product. Further, the isomeric raw materials are difficult to reuse, even if recovered. Moreover, the byproduced isomers are very difficult to separate for purification from the intended organosilicon compound, due to the similarity in chemical structure.

SUMMARY OF THE INVENTION

It is accordingly an object of this invention to provide a platinum catalyst composition with which it is possible to obviate the aforementioned problems or inconveniences accompanying the hydrosilylation reaction, and a process for producing the platinum catalyst composition.

According to this invention, there is provided a platinum catalyst composition comprising a diolefin component represented by the following general formula:

$$CH_2=CH-R-CH=CH_2 \qquad (I)$$

wherein R represents a divalent saturated hydrocarbon radical of from 2 to 10 carbon atoms, and a platinum compound component having a platinum valence of 0, 2, 4 or an admixture of at least two of 0, 2 and 4.

The platinum catalyst composition is produced by reacting the diolefin represented by the above general formula (I) with the platinum compound having a platinum valence of 0, 2, 4 or an admixture of at least two of 0, 2 and 4.

The platinum catalyst composition of this invention is extremely useful for a hydrosilylation reaction between an organosilicon compound having a ≡SiH radical in its molecule and an olefin. When used for the hydrosilylation reaction, the platinum catalyst composition inhibits effectively the isomerization of the raw material olefin, thereby enabling the intended organosilicon compound to be obtained in a high yield.

DETAILED DESCRIPTION OF THE INVENTION

Diolefin

The diolefin used in this invention is an olefin which, as represented by the general formula (I):

$$CH_2=CH-R-CH=CH_2 \qquad (I)$$

(wherein R is as defined above), has double bonds at both ends of its molecular chain.

In the general formula (I), the radical R is a divalent saturated hydrocarbon radical of from 2 to 10 carbon atoms, for example, ethylene, propylene, butylene, hexylene, octylene, decylene, cyclohexylene, etc., which may be branched partially.

In this invention, diolefins in which the radical R is linear, such as 1,5-hexadiene, 1,7-octadiene, 1,9-decadiene, 1,11-dodecadiene, etc., are used particularly preferably, from the viewpoint of coordination with platinum and the isomerization-inhibitive effect. In this case, diolefins with a shorter chain, such as butadiene, pentadiene, etc., are unsuitable because of their poorer inhibitive effect on the isomerization, whereas diolefins with a longer chain, such as 1,14-pentadecadiene, are unsuitable because they are susceptible to solidification and, therefore, difficult to deal with. Further, cyclic diolefins such as cyclooctadiene are also too poor in the isomerization-inhibitive effect to attain the object of this invention. In any way, only the use of the diolefin represented by the aforementioned general formula (I) makes it possible to obtain a platinum catalyst composition capable of inhibiting effectively the isomerization which would otherwise occur at the time of the hydrosilylation reaction.

Platinum compound

The platinum compound used in combination with the above-mentioned diolefin in this invention is a platinum compound having a platinum valence of 0, 2, 4 or an admixture of at least two of 0, 2 and 4.

Representative, but not limitative, examples of the platinum compound include the followings:

platinum compounds with a platinum valence of 2, such as platinum halides represented by the formula $PtX_2$ where X represents a halogen atom, the same applying hereinbelow, e.g. platinum(II) chloride, platinic acids, e.g. tetrachloroplatinic(II) acid, alkali salts of platinic(II) acid, e.g. potassium tetrachloroplatinate(II), etc.;

platinum compounds with a platinum valence of 4, such as platinum halides represented by the formula $PtX_4$, e.g. platinum(IV) chloride, platinic acids, e.g. hexachloroplatinic(IV) acid, alkali salts of platinic acid(IV), e.g. potassium hexachloroplatinate(IV) or sodium hexachloroplatinate(IV), etc.; and platinum compounds with a platinum valence of 0, such as platinum complexes having a neutral ligand, e.g., $Pt(PPh_3)_4$ where Ph represents the phenyl group.

The platinum compounds may be used singly or in combination of two or more.

The platinum compounds are, if necessary, dissolved in a solvent such as an alcohol, etc., before put to use.

Production of platinum catalyst composition

The platinum catalyst composition of this invention is produced by reacting the aforementioned specified diolefin and platinum compound with each other.

The reaction between the two components may be carried out by mixing both the components in a solvent system, in the same manner as in a method of preparing a Zeise's salt [Refer to *Shin Jikken-Kaoaku Kohza (A New Course in Experimental Chemistry)*, vol. 12, 255, 1976, Maruzen Co., Ltd.].

The reaction temperature, which depends on the kinds of the diolefin and the platinum compound used, is in general preferably from 10 to 100° C, more preferably from 20° to 80° C., and most preferably from 40° to 80° C. The reaction may be normally carried out sufficiently for about 1 to 24 hours.

It is preferred that the diolefin be used in an amount of generally from 0.5 to 8 moles, more preferably from 2 to 6 moles, per mole in terms of platinum of the platinum compound.

In view of the expensiveness of platinum itself and in order to reduce errors associated with the addition of the reaction product as a catalyst, the platinum compound may be diluted with an alcohol or a hydrocarbon solvent so as to obtain an effective platinum component concentration on the order of several percent, before used for the reaction.

Furthermore, because side reactions may be caused by free chloride ions when a chlorine-containing platinum compound such as chloroplatinic acid is used as the platinum compound, it is desirable in such a case to neutralize the chlorine-containing platinum compound with a base such as sodium hydrogencarbonate, sodium carbonate, hydrazine, etc., before reacting the platinum compound with the diolefin, or to react the chlorine-containing platinum compound with the diolefin and then neutralize the reaction product by addition of the aforementioned base. In general, it is preferred to neutralize the chlorine-containing platinum compound prior to the reaction between the platinum compound and the diolefin.

The reaction product obtained as above is subjected to the usual purification treatments, such as filtration, extraction, etc., for removing the by-produced salts, such as sodium chloride, and the surplus neutralizer and the like therefrom, before used as the platinum catalyst composition.

Platinum catalyst composition

In the platinum catalyst composition obtained by the aforementioned method, the reaction product of the diolefin with the platinum compound is formed at least in a portion of the composition, and the presence of the reaction product is considered to be the origin of the effective catalytic action on the hydrosilylation reaction. The reaction product is presumed to comprise an olefin-platinum complex salt having a platinum atom as a central atom with which the double bonds of the diolefin are coordinated. The olefin-platinum complex salt is considered to have a chemical structure of, for example,

[PtZ$_2$], [X$_4$PtZ$_2$], [X$_2$PtZ$_2$PtX$_2$],

[X$_4$PtZ], [X$_2$PtZ]

or the like, where Z represents the diolefin.

The platinum catalyst composition of this invention, comprising the diolefin component and the platinum compound component as mentioned above, is used after being diluted, if necessary, with an organic solvent so as to obtain a platinum concentration of from 0.1 to 5% by weight.

Hydrosilylation reaction

The platinum catalyst composition of this invention is used profitably as a catalyst for effective acceleration of the hydrosilylation reaction between an organosilicon compound having a ≡SiH radical in its molecule and an organic compound having an unsaturated bond at an end of the molecular chain thereof which is represented by, for example the following general formula:

$$CH_2=CH-CH_2-R^1 \quad (II)$$

wherein R$^1$ represents a monovalent organic radical, or the general formula:

$$CH_2=CH-CH_2-R^2-CH_2-CH=CH_2 \quad (III)$$

wherein R$^2$ represents a divalent saturated hydrocarbon radical of up to 8 carbon atoms or a single bond.

That is, the hydrosilylation reaction is the addition of the ≡SiH radical to the olefin linkage, and the addition reaction causes the synthesis of the organosilicon compound having a silyl radical which is represented by the following formula:

$$\equiv Si-CH_2CH_2CH_2-R^1 \quad (IV)$$

$$\equiv Si-CH_2CH_2CH_2-R^2-CH_2-CH=CH_2 \quad (V)$$

or $$\equiv Si-CH_2CH_2CH_2-R^2-CH_2CH_2CH_2-Si\equiv \quad (VI)$$

If the above reaction is carried out by use of a conventionally known platinum catalyst, part of the olefin or diolefin used as the starting material undergoes rearrangement of its terminal double bond, resulting in the formation of the isomers having low reactivity.

For instance, when the monoolefin of the formula (II) is used, part of the raw material olefin remains as an isomer in the unreacted state, as represented by the following reaction equation:

$$X_3Si-H + CH_2=CH-CH_2-R^1$$
$$\rightarrow X_3Si-CH_2CH_2CH_2-R^1 + CH_3-CH=CH-R^1$$

so that the yield of the intended reaction product is extremely low. Furthermore, the isomer of the raw material olefin thus left unreacted is extremely poor in reactivity and is, therefore, difficult to reuse through recovery.

Also, when the diolefin of the formula (III) is used, part of the starting material diolefin is isomerized through rearrangement, as represented by the following reaction equation:

$$X_3Si-H + CH_2=CH-CH_2-R^2-CH_2-CH=CH_2 \longrightarrow$$

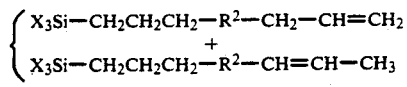

in the case of using an excess of the diolefin, or by the following reaction equation:

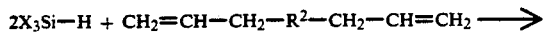

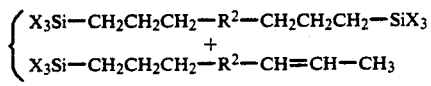

in the case of using an excess of the organosilicon compound. Consequently, large amounts of by-products are formed in addition to the intended compound, resulting in an extremely low yield of the intended compound. Moreover, where an excess of the diolefin is used, the principal product and the by-products formed are isomeric with each other; therefore, purification of the principal product by separation is difficult to achieve. In these cases, also, part of the raw material diolefin is left unreacted, in the form of isomers with low reactivity.

Thus, in carrying out the aforementioned hydrosilylation reaction by use of a conventionally known platinum catalyst, it has been impossible to obviate the above-mentioned problems or inconveniences, due to the isomerization of the olefin compound used as a starting material.

On the other hand, when the aforementioned platinum catalyst of this invention is applied to the hydrosilylation reaction, the isomerization of the starting material olefin compound is inhibited effectively, whereby the problems or inconveniences such as the lowered yield of the intended product, etc., are obviated effectively.

In the hydrosilylation reaction to which the platinum catalyst of this invention is applied, the organosilicon compound to be used is not particularly limited, insofar as it has at least one $\equiv$SiH radical in its molecule. The usable organosilicon compounds can have any of structures ranging from a monomer which has only one Si atom in its molecule to an organopolysiloxane which has a multiplicity of Si atoms in its molecule.

Nonlimitative examples of the organic compound having an unsaturated bond at an end of its molecular chain include monoolefins such as 1-butene, 1-hexene, 1-octene, 1-decene, 1-octadecene, etc., epoxyolefines such as acryl glycidyl ether, etc., acrylolefins such as allyl methacrylate, allyl acrylate, etc., haloolefins such as acryl chloride, vinylbenzyl chloride, etc., dienes such as 1,5-hexadiene, 1,7-octadiene, 1,9-decadiene, 1,11-dodecadiene, 1,13-tetradecadiene, etc., and styrenes such as styrene, α-methylstyrene, etc. Among these organic compounds, those diolefins having unsaturated double bonds at both ends of the molecular chain thereof are particularly preferred.

The hydrosilylation reaction is generally carried out in an organic solvent at a temperature ranging from room temperature to 200° C., preferably from 30° to 150° C. In the reaction, the platinum catalyst composition of this invention is used in an amount of from $1\times10^{-5}$ to $1\times10^{-1}$ mol % (calculated as platinum) based on the organosilicon compound used as a reactant.

EXAMPLES

Example 1

A flask equipped with a cooling pipe, a thermometer, an agitator and a nitrogen gas inlet port was charged with 5.2 g (10 mmol) of hexachloroplatinic(IV) acid hexahydrate ($H_2PtCl_6\cdot6H_2O$), to which 4.9 g (60 mmol) of 1,5-hexadiene and 26 g of ethanol (as solvent) were added to permit dissolution. To the contents of the flask, 6.7 g (80 mmol) of sodium hydrogencarbonate ($NaHCO_3$) was added slowly, upon which vigorous bubbling occurred.

After agitation was continued for a while and the bubbling ceased, the reaction system was maintained under a stream of nitrogen while the reaction was effected at 50° to 65° C. for 2 hours. The reaction mixture, initially yellowish orange in color, turned dark red upon the reaction.

After the reaction was over, the reaction mixture was cooled and filtered to remove by-produced sodium chloride and the surplus sodium hydrogencarbonate therefrom. The filtrate obtained was concentrated at 40° to 50° C. under a reduced pressure (100 torr or below) to remove the solvent. The residual liquid was diluted with toluene to obtain a total weight of 100 g, followed by filtration again to remove the remaining sodium chloride and sodium hydrogencarbonate.

The solution of the platinum-diolefin complex thus obtained was found, upon analysis, to have a platinum concentration of 1.43%.

The solution was diluted further with toluene to form a solution having a platinum concentration of 0.2%. This solution was name catalyst E1.

Example 2

In the same manner as in Example 1, 5.2 g (10 mmol) of hexachloroplatinic(IV) acid hexahydrate was reacted with 8.3 g (60 mmol) of 1,9-decadiene, upon which the color of the reaction mixture changed from the initial yellowish orange to dark red.

After the reaction was over, the reaction mixture was treated in the same manner as in Example 1, to yield a toluene solution of a platinum-diolefin complex.

Upon analysis, the solution of the complex was found to have a platinum concentration of 0.78%.

The complex solution was diluted further with toluene to obtain a solution having a platinum concentration of 0.2%. This solution was named catalyst E2.

Example 3

By use of the same apparatus as used in Example 1, a mixture of 5.2 g (10 mmol) of hexachloroplatinic(IV) acid hexahydrate, 4.9 g (60 mmol) of 1,5-hexadiene and 26 g of ethanol (as solvent) was reacted under a stream of nitrogen at 50° to 65° C. for 2 hours. Then, the reaction mixture was cooled, and diluted with ethanol to obtain a total weight of 100 g.

The solution of the platinum-diolefin complex thus obtained was found, upon analysis, to have a platinum concentration of 2.11%.

The solution of the complex was diluted further with toluene to obtain a solution having a platinum concentration of 0.2%. This solution was named catalyst E3.

Example 4

By use of the same apparatus as used in Example 1, a mixture of 4.2 g (10 mmol) of potassium tetrachloroplatinate(II) (K₂PtCl₄), 4.9 g (60 mmol) of 1,5-hexadiene and 16 g of ethanol (as solvent) was treated in the same manner as in Example 3, to obtain an ethanol solution of a platinum-diolefin complex.

The platinum concentration of the solution of the complex was analyzed to be 2.25%.

The complex solution was diluted further with toluene to obtain a solution having a platinum concentration of 0.2%. This solution was named catalyst E4.

Comparative Example 1

In the same manner as in Example 1, a mixture of 5.2 g (10 mmol) of hexachloroplatinic(IV) acid hexahydrate was reacted with 11.2 g (60 mmol) of 1,3-divinyl-1,1,3,3-tetramethyldisiloxane represented by the following formula:

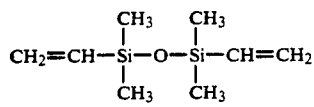

Upon the reaction, the color of the reaction mixture changed from the initial yellowish orange to dark red.

After the reaction was over, the reaction mixture was treated in the same manner as in Example 1, to yield a toluene solution of a platinum-siloxane complex.

Upon analysis, the platinum concentration of the solution of the complex was found be 0.63%.

The complex solution was diluted further with toluene to obtain a solution having a platinum concentration of 0.2%. This solution was named catalyst C1.

Comparative Example 2

A toluene solution of a platinum-diolefin complex was obtained in the same manner as in Comparative Example 1 except that 6.5 g (60 mmol) of 1,5-cyclooctadiene was used in place of the 1,3-divinyl-1,1,3,3-tetramethyldisiloxane.

Upon analysis, the platinum concentration of the solution of the complex was found to be 0.75%.

The complex solution was diluted further with toluene to obtain a solution having a platinum concentration of 0.2%. This solution was named catalyst C2.

Comparative Example 3

Hexachloroplatinic(IV) acid hexahydrate was dissolved in each of n-butyl alcohol, sec-butyl alcohol, t-butyl alcohol and 2-ethylhexanol to prepare respective solutions having a platinum concentration of 2%. The solutions were diluted further with toluene to obtain solutions having a platinum concentration of 0.2%.

The solutions thus obtained were named catalysts C3, C4, C5 and C6, respectively.

Application Example

A flask equipped with a cooling pipe, a dropping funnel, a thermometer and an agitator was charged with 277 g (2 mol) of 1,9-decadiene and 250 g of toluene (as solvent), and the contents of the flask was heated to about 60° C. under a stream of nitrogen.

To such a system was added each of the catalysts E1 to E4 and catalysts C1 to C6 obtained in the above Examples and Comparative Examples, in an amount (calculated as platinum) of 50 μmol each, to prepare 10 kinds of reaction systems.

Into each of the reaction systems, 136 g (1 mol) of trichlorosilane (HSiCl₃) was added dropwise through a dropping funnel, upon which heat generation was observed.

After the dropwise addition, each of the reaction systems was reacted at 60° to 65° C. for 1 hour. For each of the reaction systems, the reaction product was analyzed by gas chromatography, and the rates of isomerization were calculated from the formulas given below. Furthermore, the rate of addition reaction was calculated according to the formula also given below, from the H₂ gas quantity determined by alkali hydrolysis of the SiH radical. The results are shown in Table 1.

$$\text{Rate of isomerization (A)} = \frac{\text{isomerized addition product (mol)}}{\text{total of addition products (mol)}} \times 100 \, (\%)$$

$$\text{Rate of isomerization (B)} = \frac{\text{isomerized unreacted decadiene (mol)}}{\text{total of unreacted decadiene (mol)}} \times 100 \, (\%)$$

$$\text{Rate of addition reaction} = 1 - \frac{\text{unreacted Cl}_3\text{SiH (mol)}}{\text{charge of Cl}_3\text{SiH (mol)}} \times 100 \, (\%)$$

In the above formulas, the rate of isomerization A is the rate of isomerization of the addition product, and the rate of isomerization B is the rate of isomerization of decadiene.

Besides, the reaction in the Application Example is represented by the following formula:

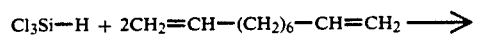

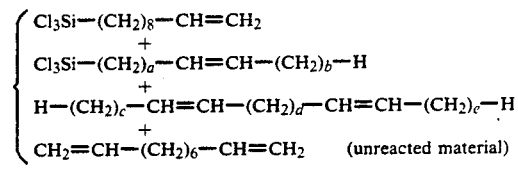

TABLE 1

| Catalyst | Rate of addition reaction (%) | Rate of isomerization (%) | |
|---|---|---|---|
| | | addition product | decadiene |
| E1 | 98.3 | 1.0 (1)* | 1.9 (1)* |
| E2 | 99.5 | 0.7 (1) | 1.4 (1) |
| E3 | 96.5 | 1.5 (1) | 2.2 (1) |
| E4 | 93.7 | 2.1 (1) | 4.5 (1) |
| C1 | 98.6 | 16.9 (1) | 47.9 (2) |
| C2 | 95.2 | 15.4 (1) | 30.3 (2) |
| C3 | 96.5 | 67.7 (2) | 68.9 (4) |
| C4 | 86.0 | 21.0 (1) | 38.1 (2) |
| C5 | 48.5 | 13.7 (1) | 20.4 (1) |
| C6 | 73.0 | 17.2 (1) | 31.6 (2) |

Remarks:
*The parenthesized numerical values each represent the number of isomers formed by the isomerization reactions, exclusive of the unisomerized addition products and 1,9-decadiene.

We claim:
1. A platinum catalyst composition consisting essentially of the reaction product of a diolefin component represented by the following general formula:

$$CH_2=CH-R-CH=CH_2$$

wherein R represents a divalent saturated hydrocarbon radical of from 2 to 10 carbon atoms, and a platinum compound component having a platinum valence of 1, 2, 4 or an admixture of at least two of 0, 2 and 4.

2. A platinum catalyst composition according to claim 1, wherein the diolefin is incorporated in an amount of from 0.5 to 8 moles per mole in terms of platinum of the platinum compound.

3. A platinum catalyst composition according to claim 2, wherein the diolefin is incorporated in an amount of from 2 to 6 moles per mole in terms of platinum of the platinum compound.

4. A platinum catalyst composition according to claim 1, wherein the olefin is at least one compound selected from the group consisting of 1,5-hexadiene, 1,7-octadiene, 1,9-decadiene and 1,11-dodecadiene.

5. A platinum catalyst composition according to claim 1, wherein the platinum compound is a platinum compound having a platinum valence of 2 selected from the group consisting of platinum halides represented by the formula: $PtX_2$ where X represents a halogen atom, platinic(II) acid and alkali salts of platinic(II) acid.

6. A platinum catalyst composition according to claim 1, wherein the platinum compound is a platinum compound having a platinum valence of 4 selected from the group consisting of platinum halides represented by the formula: $PtX_4$ where X represents a halogen atom, platinic(IV) acid and alkali salts of platinic(IV) acid.

7. A platinum catalyst composition according to claim 1, wherein the platinum compound is a platinum complex having a neutral ligand.

8. A process for producing a platinum catalyst composition consisting essentially of the reaction product of a diolefin with a platinum compound, which comprises reacting a diolefin represented by the following general formula:

$$CH_2=CH-R-CH=CH_2$$

wherein R represents a divalent saturated hydrocarbon radical of from 2 to 10 carbon atoms, with a platinum compound having a platinum valence of 0, 2, 4 or an admixture of at least two of 0, 2 and 4.

9. A process according to claim 8, wherein the diolefin is used in an amount of from 0.5 to 8 moles per mole in terms of platinum of the platinum compound.

10. A process according to claim 8, wherein the reaction is carried out at a temperature of from 10° to 100° C.

11. A process according to claim 10, wherein the reaction is carried out at a temperature of from 20° to 80° C.

12. A process according to claim 11, wherein the reaction is carried out at a temperature of from 40° to 80° C.

13. The platinum catalyst composition of claim 1, which contains minor amounts of unreacted diolefin and platinum compound in an amount insufficient to effectively cause the isomerization of an olefin.

14. The process according to claim 8, wherein said platinum catalyst composition contains minor amounts of unreacted diolefin and platinum compound in an amount insufficient to effectively cause the isomerization of an olefin.

* * * * *